United States Patent [19]

Nakane et al.

[11] Patent Number: 5,043,215

[45] Date of Patent: Aug. 27, 1991

[54] HALOGEN-CONTAINED POLYESTER RESIN COMPOSITE AND ELECTRIC WIRE

[75] Inventors: Toshio Nakane, Fuji; Kenji Hijikata, Mishima; Yukihiko Kageyama, Fujinomiya; Michiro Naka, Fuji, all of Japan

[73] Assignee: Polyplastics Co., Ltd., Osaka, Japan

[21] Appl. No.: 515,363

[22] Filed: Apr. 30, 1990

Related U.S. Application Data

[63] Continuation of Ser. No. 7/163,604, Mar. 3, 1988, abandoned.

[30] Foreign Application Priority Data

Apr. 24, 1987 [JP] Japan .................................. 63-101466

[51] Int. Cl.$^5$ .................. C08K 5/3415; C08K 5/3432
[52] U.S. Cl. ..................................... 428/378; 524/98; 524/102; 524/104
[58] Field of Search .......................... 524/98, 102, 104; 428/378

[56] References Cited

U.S. PATENT DOCUMENTS

| 3,640,964 | 2/1972 | Stewart et al. | 528/299 |
| 3,776,887 | 12/1973 | Juelks et al. | 528/299 |
| 3,873,504 | 3/1975 | Boettcher et al. | 528/305 |
| 3,966,682 | 6/1976 | Nelson et al. | 528/299 |
| 4,028,308 | 6/1977 | Nelson | 528/299 |
| 4,080,360 | 3/1978 | Schlichting et al. | 528/98 |
| 4,499,219 | 2/1985 | Buxbaum et al. | 528/98 |

*Primary Examiner*—Veronica P. Hoke
*Attorney, Agent, or Firm*—Birch, Stewart, Kolasch & Birch

[57] ABSTRACT

A halogen-containing polyester resin composition having an improved stable flexibility and flame retardancy which comprises a bislactam compound and a flame-resisting aromatic polyester copolymers containing halogen at a ratio of 0.5 to 30% by weight, said copolymers being by the poly-condensation of (A) aromatic dicarboxylic acids or ester-forming derivatives thereof;

(B) aliphatic glycols or ester-forming derivatives thereof; and (C) halogen-containing ester-forming compounds, said bislactam compound being present in a ratio of 0.1 to 10% by weight based on the total quantity of the composite.

12 Claims, No Drawings

HALOGEN-CONTAINED POLYESTER RESIN COMPOSITE AND ELECTRIC WIRE

This application is a continuation of application Ser. No. 07/163,604 filed Mar. 3, 1988 now abandoned.

BACKGROUND OF THE INVENTION

1. Field of the Invention

The present invention relates to a coating material for an electric wire, and more particularly to a polyester resin composite, in which flexibility is not lost by a thermal hysteresis and the flame-resistance is superior. The resin composite is obtained by adding bislactam compounds to halogen-containing flame-resisting aromatic polyester copolymers. The present invention is also concerned with an electric wire coated the resin composite.

2. Prior Art

Rubber, polyvinylchloride, polyethylene, polypropylene, nylon and the like have been used as a coating material of an electric wire. In particular, an important position has been given to polyvinylchloride in view of its flame-resistance and mechanical strength. Recently, as a result of where these coating materials are used, requirements of the coating materials, such as superior heat resistance, electrical characteristics, flame resistance and thin-wall workability for achieving space-saving have become severe and accordingly up-graded.

Fluorine resins, cross linked polyethylene and the like meet these requirements but these materials are inferior in thin-wall workability and also the fluorine resins are expensive, so that it cannot be said that they are satisfactory.

Polyethylene terephthalate and polybutylene terephthalate are gathering interest in view of their superior thin-wall workability, mechanical strength (such as flexibility and abrasion-resistance), heat-resistance and electrical characteristics but they are insufficient in flame-resistance and crystallinity, so that not only is their flexibility remarkably lowered by the thermal hysteresis, such as a heat treatment after coating and heating condition during use, but also the mechanical strength, such as impact resistance, are lowered. Accordingly, use near a heat source must be avoided as well as an environment having the possibility where heat may be accumulated. That is to say, their use is materially limited.

In order to overcome these defects, elastomers and amorphous polymers have been added to lower the crystallinity. In addition, in order to maintain the stability of mechanical strength, a partial cross-linkage and the like have been tried.

In the former, a slight improvement in effect is observed but since a crystalline resin matrix exists as it is, polyalkylene terephthalates can not withstand long-range thermal hysteresis. In addition, a defect occurs in that a reduction in the share of crystalline resin leads to a deterioration of mechanical characteristics such as frictional abrasion.

In addition, in the latter case, a slight improvement in the stability of the mechanical characteristics resulting from the cross-linkage is observed but defects occur in that the flexibility is sacrificed and the progress of the cross-linking reaction leads to a complicated control, so that the workability is remarkably lowered.

SUMMARY OF THE INVENTION

In view of the above described problems, the present inventors earnestly investigated the possibility of obtaining a coating material for use in electric wire which does not lose its flexibility due to thermal hysteresis and is superior in flame resistance, mechanical characteristic and electrical characteristics. The coating material of the present invention can thus be obtained by adding specified compounds to halogen-containing flame-resisting aromatic polyesters.

That is to say, the present invention relates to a halogen-containing polyester resin composite, characterized by the fact that bislactam compounds are added to the flame-resisting aromatic polyester copolymers containing a halogen content in an amount of 0.5 to 30% by weight, which are obtained by polycondensation using.

(A) mainly aromatic dicarboxylic acids or ester-forming derivatives thereof;

(B) mainly aliphatic glycols or ester-forming derivatives thereof; and (C) halogen-containing ester-forming compounds, said bislactam compound being present in an amount of 0.1 to 10% by weight based on a total quantity of the composite and an electric wire coated therewith.

It is remarkably difficult to simultaneously meet the requirements of various characteristics, such as flame resistance, frictional abrasion resistance and flexibility (bending property and high elongation), which are required for use as a coating material of the electric wire, as in the present invention, including the requirements of maintaining an initial high elongation and bending property without losing the flexibility due to thermal hysteresis, even when exposed to a heated environment for a long period of time. It is wonderful that a combination of halogenated copolyesters of polyalkylene terephthalate with bislactam compounds at an appointed ratio meets various the kinds of characteristics required for a coating material for an electric wire. In particular the addition of lactam prevents of the loss of flexibility due to thermal hysteresis and, in fact, a remarkable increase instability in a long-range heated environment is achieved.

A polyester copolymer composite used in the present invention is described below.

Initially, the ingredients constructing the aromatic polyester copolymers as the base of the coating material of the present invention are described. Ingredient (A) is mainly aromatic dicarboxylic acids or ester-forming derivatives thereof. The representative substances thereof include terephthalic acid or derivatives thereof. In addition, dicarboxylic acids, such as isophthalic acid, naphthalene carboxylic acid and naphthalene dicarboxylic acid, or derivatives, fatty acids, such as adipic acid, cebatic acid, trimeritic acid and succinic acid, or ester-forming derivatives thereof and aromatic hydroxycarboxylic acids, such as hydroxybenzoic acid and hydroxynaphthoic acid, are supplementarily used according to circumstances.

Next, the ingredient (B) constructing polyester copolymers according to the present invention are mainly aliphatic diols or ester-forming derivatives thereof. The typical substance of aliphatic diols or ester-forming derivatives thereof includes low molecular glycol of $C_2$ to $C_8$ such as ethylene glycol, 1, 4-butylene glycol, 1, 3-propane diol, 1, 4-butene diol, 1, 6-hexane diol and 1, 8-octane diol. In addition, high molecular weight glycol, such as polyalkylene oxide glycol, for example polyethylene oxide glycol, polybutylene oxide glycol and the like, can be used together with such low molecular weight glycol. Such use of a high molecular weight glycol together with low molecular weight glycol is remarkably effective for improving an elongation of aromatic polyesters, which are coating materials of an electric wire according to the present invention, while also adding bending-resistance to the polyester. Furthermore, aromatic alcohols of phosphinic acid having a bisphenol-A group, 4, 4'-dihydroxybiphenyl group and aromatic diol group and the like, polyhydroxylic compounds, such as alkylene oxide-added alcohol, glycerin and pentaerythritol, for example two mols of ethylene oxide-added bisphenol A, two mols of propylene oxide-added bisphenol A and the like, or ester-forming derivatives thereof and the like can be supplementarily used as the ingredient (B).

Next, the ingredient (C) for the polyester copolymers as the composite of the present invention are aromatic polyester copolymers with halogen atoms bonded in the molecule obtained by using halogen-containing ester-forming compounds as monomers. The halogen-containing compounds used for this object include the following compounds. In addition, bromine is preferably used as the halogen.

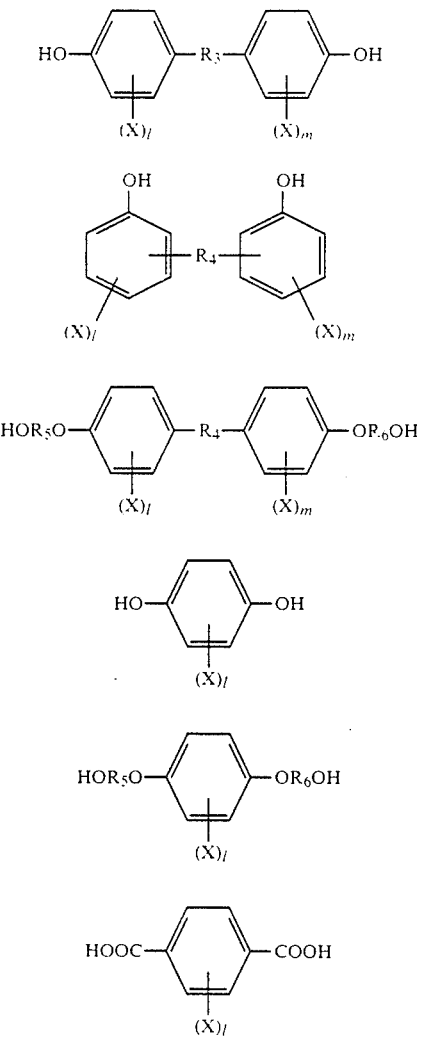

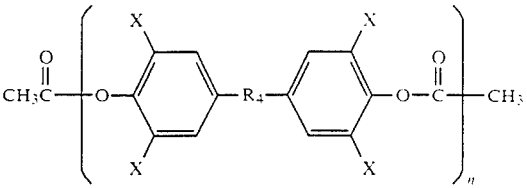

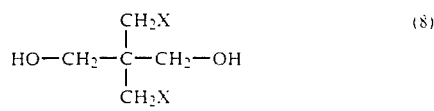

wherein

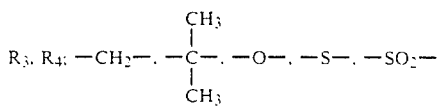

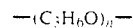 

X: halogen;
l, m: integer of 1 to 4; and
n: integer of 1 or more.

Halogen-contained compounds expressed by the general formulae (1) to (7) are preferably incorporated as the copolymer compounds. In the case where bromine is used as halogen, tetrabromobisphenol A and tetrabromobisphenol sulfone are given as an example of the general formula (1), tetrabromobisphenol F as an example of the general formula (2), two mols of ethylene oxide-added tetrabromobisphenol A, two mols of propylene oxide-added tetrabromobisphenol A, two mols of ethylene oxide-added tetrabromobisphenol sulfone and two mols of propylene oxide-added tetrabromo-bisphenol sulfone as an example of the general formula (3), tetrabromohydroquinone as an example of the general formula (4), two mols of ethylene oxide-added tetrabromohydroquinone as an example of the general formula (5), tetrabromoterephthalic acid as an example of the general formula (6) and polycarbonate of tetrabromobisphenol A as an example of the general formula (7).

Halogen-contained compounds having a molecular weight of 390 or more are preferably use as monomers. A molecular weight which is too low does not contribute to the improvement of an oxygen index which is an index of flame-resistance. Halogen-containing compounds containing at least one aromatic ring in a molecule are preferably used.

These halogen-containing compounds are added so that the content of halogen present in the formed copolyester may amount to 0.5 to 30% by weight, preferably 2 to 20% by weight. In the case where they are added at a ratio of less than 0.5% by weight, a sufficient flame-resistance cannot be attained while in the case where they are added at a ratio exceeding 30% by weight, the mechanical properties thereof become deteriorated, which is not desirable.

As to a rate of monomers for preparing polyester copolymers used in the present invention, in the case where an ester-forming functional group of the ingredient (C), that is, halogen-contained compounds, is alcoholic, the ingredient (B) +the ingredient (C) are 90 to 200 mols, preferably 95 to 150 mols, based on 100 mols of the ingredient (A) while in the case where the ester-forming functional group of the ingredient (C), that is, halogen-containing compounds, is carboxylic, the ingredient (B) is 90 to 200 mols, preferably 95 to 150 mols, based on 100 mols of the ingredient (A) + the ingredient (C).

In the case where the coating material having a high oxygen index is required according to the using condition, the content of halogen in the copolymer is adjusted by suitably selecting the content of ingredient (C) to meet the desired oxygen index.

The copolymers used in the present invention can be polymerized by known methods, such as by melt polymerization, boundary polymerization and solid phase polymerization, and copolymers having an intrinsic viscosity of about 0.5 to 3.0 can be used.

The composite of the present invention is characterized by the addition of bislactam compounds to said halogen-containing polyester copolymers in an appointed ratio.

The bislactam compounds are expressed by the following general formula (a):

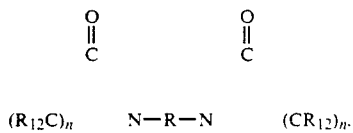

wherein R is a divalent organic group, $R_{12}$ is a hydrogen atom, an alkyl group or an aryl group and n is an integer from 2 to 8.

In the formula (a), R is preferably expressed by the following formula (b) or (c).

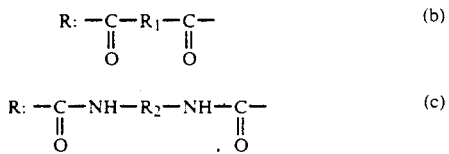

wherein $R_1$, $R_2$ is a divalent organic group.

It is preferable that $R_1$, $R_2$ is an organic group containing at least one aromatic ring.

The formula (b) expresses a dicarboxylic acid group. Usual dicarboxylic acids, such as terephthalic acid, isophthalic acid, naphthalene dicarboxylic acid, adipic acid, sebacic acid, trimeritic acid and succinic acid, can be used. Of them, terephthalic acid, isophthalic acid, naphthalene dicarboxylic acid and the like are preferably used.

These compounds can be produced by conventional methods but a method of reacting ethylene imine with each chloride compound of the acids is easy.

The formula (c) expresses a nitrogen bond which can be introduced by various methods. The method of reacting ethylene imine with isocyanate is generally easy and the usual diisocyanates can be used. These diisocyanates include toluene-diisocyanate, methylene-diphenyl-diisocyanate, xylene-diisocyanate, naphthalene-diisocyanate, 3, 3'-dimethyldiphenyl-4, 4'-diisocyanate hexamethylene-diisocyanate, isophorone-diisocyanate, hydrated methylene-biphenyl-diisocyanate, hydrated toluene-diisocyanate, resin-diisocyanate, bis(2-isocyanatethyl)fumarate and the like. Of them, methylene-diphenyl-diisocyanate, xylilene-diisocyanate, isophorone-diisocyanate and the like are preferably used.

The lactam compounds having 2 to 8 methylene groups are suitably used. Pyrrolidone, piperidone and caprolactam having 3 to 5 methylene groups are preferably used.

In addition, bislactam compounds expressed by the formula (a) include also addition compounds obtained by preliminarily reacting them with compounds having a reactive activated hydrogen, such as carboxylic acid, an alcohol and a thiol, before blending. High molecular weight compounds can be easily produced from low molecular weight compounds in the form of addition compounds having a lactam type end by reacting compounds having at least two activated hydrogen groups with the bislactam compounds.

The bislactam compounds are added at a ratio of 0.1 to 10% by weight, preferably 0.1 to 5% by weight, based on the total quantity of the composite. If the quantity of the bislactam is too little, the advantageous effects are not attained whereas if the quantity is too large, the ill effects which occur in that the viscosity is extremely increased results in an increase in decomposed products.

The bislactam compounds may be added in the manufacture of said aromatic copolyester or by blending in the manufacture of pellets.

Although the coating material used in the present invention exhibits superior properties even without using additives, in order to further improve the performance of the coating material, stabilizers, such as antioxidants and ultraviolet ray absorbants, antistatic agents, flame-retardants, assistant flame-retardants, coloring agents such as dyestuffs and pigments, agents for improving the fluidity and releasability, lubricants, crystallization promotors (nucleus agents), inorganic substances and the like can be used, if necessary. In particular, the addition of antioxidants together with lactam leads to a still more improved effect.

Hindered phenol series, amine series, phosphor series and like compounds can be used as stabilizers.

2, 2'-methylene-bis(4-methyl-6-t-butylphenol), hexamethylene-glycol-bis(3, 5-di-t-butyl-4-hydroxy-hydrocinnamate), tetrakis(methylene(3, 5-di-t-butyl-4-hydroxy-hydrocinnamate))methane, triethylene-glycol-bis-3-(3-t-butyl-4-hydroxy-5-methylphenyl)propyonate, 1, 3, 5-trimethyl-2, 4, 6-tris(3, 5-t-butyl-4-hydroxybenzyl)benzene, n-octadecyl-3-(4'-hydroxy-3',5'-di-t-butylphenol) propyonate, 4, 4'-methylene-bis(2, 6-di-t-butylphenol), 4, 4'-butylidene-bis(6-t-butyl-3-methylphenol), 2, 2'-thiodiethyl-bis3-(3, 5-di-t-butyl-4-hydroxyphenyl)-propyonate, distearyl-3, 5-di-t butyl-4-hydroxybenzyl-phosphonate, and 2-t-butyl-6-(3-t-butyl-5-methyl-2-hydroxybenzyl)-4-methylphenyl acrylate can be used as the hindered phenol series of compounds singly or in combination. Of these compounds, hexamethylene-glycol-bis [(3, 5-di-t-butyl-4-hydroxyhydrocinnamate), tetrakis methylene (3, 5-di-t-butyl-4-hydroxyhydrocinnamate)] methane and triethylene-glycol-bis-3-(3-t-butyl-4-hydroxy-5-methylphenyl}propyonate are preferably used.

The amine series of compounds include N-phenyl-N'-isopropyl-p-phenylene-diamine, N, N'-diphenyl-p-phenylene-diamine, 4, 4'-bis(4-α,α-dimethylbenzyl) diphenylamine, condensation products of diphenylamine and acetone, N-phenylnaphthylamine, N, N'-di-β-naphthyl-phenylene-diamine and the like.

The phosphor series of compounds include phosphonite compounds expressed by the following general formula (9) and the like.

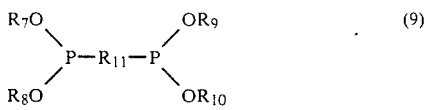 (9)

wherein $R_7$, $R_8$, $R_9$ and $R_{10}$ are same or different alkyl, substituted alkyl, aryl or substituted aryl groups having 1 to 25 carbon atoms. These groups include a methyl group, ethyl group, butyl group, octyl group, decyl group, lauryl group, tridecyl group, stearyl group, phenyl group, alkyl and/or alcoxyl-substituted phenyl group and the like. In addition, $R_{11}$ is an alkylene, substituted alkylene, arylene or substituted arylene group having 4 to 33 carbon atoms. These groups include a butylene group, octylene group, phenylene group, naphthylene group, diphenylene group, groups expressed by the following formula and the like.

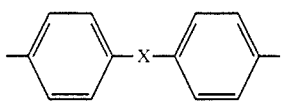

wherein X is an oxyl, sulfonyl, carbonyl, methylene, ethylidene, butylidene, isopropylene, diazonium group and the like. Tetrakis(2, 4-di-t-butylphenyl)-4, 4'-diphenylene-phophonite is preferably used as the phophonite compounds.

They are added at a ratio of 0.01 to 5% by weight, preferably 0.1 to 3% by weight, based on a total quantity of the composite.

In addition, a metallic compounds containing zinc and bismuth, clayey silicate, such as magnesium hydroxide and asbestos, and the like can be used alone or in combination as the assistant flame-retardant or flame-retardants in addition to antimony compounds such as antimony trioxide and antimony halogenide.

In addition, the inorganic substances include general inorganic fibers, such as glass fiber, ceramic fiber, boron fiber, potassium titanate fiber and asbestos, powdery and granular substances, such as calcium carbonate, highly dispersive silicate, alumina, aluminium hydroxide, talc, clay, mica, glass flake, glass powder, glass bead, silica powder, quartz sand, wollastonite, carbon black, barium sulfate, plaster, silicon carbide, alumina, boron nitride and silicon nitride, platelike inorganic compounds, whiskers and the like.

These inorganic fillers can be used singly or in combination.

In addition, in order to improve the melt extrusion coating property, lubricancy, flexibility and the like, organic high molecular substances can be supplementarily added singly or in combination. These organic high molecular substances include other polyesters, polyamides, polyolefins and copolymers thereof, rubber-like high molecular substances, such as low molecular polyethylene, polycarbonate, polyurethane, butyl rubber and ABS, multi-phase copolymers formed of polyacrylate resins, thermoplastic segment type copolyesters and the like (including graft-copolymers).

An electric wire according to the present invention is produced by the known methods. Usually, the coating material is coated on the travelling conductor by melt extrusion. The electric wire can be manufactured where the travelling direction of the conductor is identical with the extrusion direction of the coating material or the case where a cross head having an appointed angle is used.

A screw type extruder, where it is easy to control the flow rate of the coating material, is preferably used.

Methods of detecting an uneven thickness of the coating material using X-ray, ultrasonic wave and the like can be used.

An eccentricity due to the uneven thickness of the coating material is expressed by a concentric coefficient $e_c$. A larger $e_c$ is desired and selected at 65% or more, preferably 70% or more.

$$e_c = \frac{e_{min}}{e_{max}} \times 100$$

$e_{min}$: minimum thickness of a section of the coating material $e_{max}$: maximum thickness of a section of the coating material In order to control uneven thickness, a method of detecting it by an uneven thickness detector and automatically or manually adjusting the clearance between a die center portion of the screw type extruder, a method of adjusting said clearance by controlling the flow rate of the coating material together with the pressure and temperature of the coating material, and the like are used.

Also the use of a non-eccentric head on the die is effective for reducing the uneven thickness.

In manufacture, in order to further increase the mechanical strength of the coating material at request, the coating material may be coated and formed and then passed through the heating zone. The temperature of the heating zone is selected at a melting point of the coating material or less but at the glass-transition point of the coating material or more.

Effects of the Invention

Since a halogen-containing resin composite according to the present invention is remarkably improved in eliminating the deterioration of properties due to a thermal hysteresis in comparison with the conventional polyester series of coating material, the following superior effects can be attained.

(1) Since the coating material is superior in flame-resistance and the deterioration of properties due to the thermal hysteresis is reduced, it is effectively used as an electric wire disposed in the vicinity of a heat source, an engine of a transport apparatus or a heat-generating part of an electric product.

(2) Since it is possible to reduce the thickness of the coating material without spoiling the mechanical characteristics and electrical characteristics and the coating material is rich in inflectional property, an effective utilization of a limited space can be remarkably increased. In particular, it can be effectively used as an electric wire used in transport apparatus, such as in a space rocket, an aircraft and motorcar, having a high accumulation degree of informations and restricted in spatial capacity, electric products, computers, information-connected apparatus and the like.

(3) Since halogen-containing compounds are incorporated in the copolymers, the coating material according to the present invention does not exhibit the oozing as found when the flame-retardant is added at high temperatures, so that it is superior in external appearance and shape, and since the blocking of electric wires among themselves in the manufacturing process can be prevented, the coating cost can be reduced.

On account of the above described special features, the coating material obtained according to the present invention can be used not only as an electrical wire in the fields such as transport apparatus, electric apparatus, electronic apparatus, information apparatus and miscellaneous machinery, but also various kinds of apparatus material, parts and the like preferably requiring to have also such properties in addition to the above described examples.

Preferred Embodiments

The present invention is described below with reference to the preferred embodiments. The copolymers P, Q and R were produced in the following manner.

Manufacturing Example 1 (Preparation of the copolymer P)

Dimethyl terephthalate of 970 parts by weight, 1,4-butane diol of 513 parts by weight, ethylene oxide of two mols-added tetrabromo-bisphenol A of 158 parts by weight and tetrabutoxytitanium of 0.7 parts by weight were put in a reaction vessel provided with a stirrer, nitrogen-introducing pipe and efflux pipe and stirred for 30 minutes, at 160° C. in a flow of nitrogen gas. The resulting mixture was gradually heated from 200° C. to 270° C. for 2 hours with stirring. Subsequently, the introduction of nitrogen into the reaction vessel was topped and then, the inside of the reaction vessel was gradually depressed until a pressure of 0.3 mmHg after 30 minutes was reached and the reaction mixture was stirred at this pressure for 3 hours. The resulting polymer showed an intrinsic viscosity of 1.0 and a bromine-content of 6.5% by weight.

Manufacturing Example 2 (Preparation of the copolymer Q)

Dimethyl terephthalate of 970 parts by weight, 1,4-butane diol of 513 parts by weight, propylene oxide of two mols-added tetrabromo-bisphenol sulfone of 171 parts by weight and tetrabutoxytitanium of 0.7 parts by weight were put in a reaction vessel provided with a stirrer, nitrogen-introducing pipe and efflux pipe and stirred for 30 minutes at 160° C. in a flow of nitrogen gas. The resulting mixture was gradually heated from 200° C. to 270° C. for 2 hours with stirring. Subsequently, the introduction of nitrogen into the reaction vessel was stopped and then, the inside of the reaction vessel was gradually depressed until a pressure of 0.3 mmHg was reached after 30 minutes. The reaction mixture was stirred for 3 hours at this pressure and at 270° C. The resulting polymer showed an intrinsic viscosity of 1.1 and a bromine-content of 6.3% by weight.

Manufacturing Example 3 (Preparation of the copolymer R)

Dimethyl terephthalate of 900 parts by weight, 1,4-butane diol of 450 parts by weight, polybutylene oxide glycol having a mean molecular weight of 400 to 50 parts by weight, 158 parts by weight of an adduct of 2 moles of ethylene oxide to tetrabromobisphenol A and tetrabutoxytitanium of 0.7 parts by weight were put in a reaction vessel provided with a stirrer, nitrogen-introducing pipe and efflux pipe and stirred for 30 minutes at 180° C. in a flow of nitrogen gas. The resulting mixture was gradually heated from 200° C. to 270° C. for 3 hours with stirring Subsequently, the introduction of nitrogen into the reaction vessel was stopped and then, the inside of the reaction vessel was gradually depressed until a pressure of 0.5 mmHg was reached after 15 minutes. The reaction mixture was stirred for 6 hours at this pressure. The resulting polymer showed an intrinsic viscosity of 1.0 and a bromine-content of 6.5% by weight.

EXAMPLE 1

Powdery isophthaloyl-bis-ε-caprolactam (hereinafter called IPBC for short) of 1.5 parts by weight was blended with copolymer P of 98.5 parts by weight and the resulting mixture was extruded by means of the conventional extruder to obtain uniformly molten and mixed pellets. The resulting pellets were injected by means of an injection molding machine in the conventional manner to prepare test pieces and their physical properties were evaluated.

The physical properties were measured by the following methods:

The tensile strength and elongation (%) were measured in accordance with ASTM D 638. The dielectric breakdown and the dielectric constant was measured in accordance with ASTM D 149 short time method and DISO 1 kHz, respectively. In addition, the flame resistance was measured by a test method conforming to UL-94V and the case where the flame went out within 30 seconds was evaluated as o while the case where the flame did not go out within 30 seconds was evaluated as x. The oxygen index was measured in accordance with JIS K 7201. As to the surface shape, the surface state was observed after 72 hours at 120° C. and in the case where something went wrong, such as bleed and swelling, this was evaluated as x whereas where no bleeding and swelling took place, the evaluation was o.

In addition, the tensile test piece was held in a thermostatic oven of 120° C. and the elongation and elongation-holding coefficient after 500 hours were measured in the same manner.

Furthermore, the resin composite was coated on circular compression stranded wires made of copper having an outside diameter of about 1.9 mm so that the film-thickness may amount to 0.3 mm produce an electric wire. The resulting wires were held in a thermostatic oven of 120° C. After a lapse of 500 hours, the wire was bent 10 times at an angle of 90° and its surface state was investigated to evaluate the inflection property. The case where cracks or fine cracks were generated was evaluated as x while the case where cracks or fine cracks were not generated was evaluated as o.

The results of measurement are shown in Table 1.

EXAMPLE 2

Powdery diphenyl-methane-bis-4, 4'-carbamoyl-ε-caprolactam (hereinafter called MDIC for short) of 1.5 parts by weight was blended with the copolymer P of 98.5 parts by weight. The resulting mixture was extruded by means of the conventional extruder to obtain uniformly molten and mixed pellets. The obtained resin composite was evaluated in the same manner as in Example 1. The results are shown in Table 1.

Examples 3 to 6

The evaluation was carried out in the same manner as in Example 1 excepting that the copolymers Q and R were used. The results are shown in Table 1.

EXAMPLES 7 to 9

Triethylene glycol bis[3-(3-t-butyl-t-methyl-4-hydroxyphenyl propyonate.](Irganox® 245) was added to each of Examples 1, 3, 5 as an anti-oxidant at a ratio of 1.0 parts by weight based on 100 parts by weight of the resin and the resulting resin composite each was evaluated in the same manner as in Example 1.

COMPARATIVE EXAMPLE 8

IPBC of 1.5 parts by weight and decabromodiphenylether of 12.5 parts by weight were added to polybutylene terephthalate of 86 parts by weight and the test pieces were prepared by mixing and evaluated in the same manner as in Example 1. The results are shown in Table 1.

TABLE 1

|  |  | Example |  |  |  |  |  |  |  |  |  |
|---|---|---|---|---|---|---|---|---|---|---|---|
|  |  | 1 | 2 | 3 | 4 | 5 | 6 | 7 | 8 | 9 | 10 |
| Resin composition |  |  |  |  |  |  |  |  |  |  |  |
| Resin used (parts by weight) |  | P 98.5 | P 98.5 | Q 98.5 | Q 98.5 | R 98.5 | R 98.5 | P 98.5 | Q 98.5 | R 98.5 | P 99.7 |
| Lactam | IPBC (parts by weight) | 1.5 | — | 1.5 | — | 1.5 | — | 1.5 | 1.5 | 1.5 | 0.3 |
|  | MDIC (parts by weight) | — | 1.5 | — | 1.5 | — | 1.5 | — | — | — | — |
| Flame-retardant (parts by weight) |  | — | — | — | — | — | — | — | — | — | — |
| Stabilizer (parts by weight) |  | — | — | — | — | — | — | 1.0 | 1.0 | 1.0 | — |
| Dielectric breakdown (kV/mm) |  | 16 | 16 | 16 | 16 | 16 | 16 | 16 | 16 | 16 | 17 |
| Dielectric constant |  | 3.2 | 3.2 | 3.1 | 3.1 | 3.2 | 3.2 | 3.2 | 3.1 | 3.2 | 3.2 |
| Flame-resistance |  |  |  |  |  |  |  |  |  |  |  |
| Oxygen index |  | 27 | 27 | 27 | 27 | 27 | 27 | 27 | 27 | 27 | 27 |
| Surface shape |  |  |  |  |  |  |  |  |  |  |  |
| Tensile strength (kg/cm²) |  | 569 | 602 | 560 | 611 | 463 | 511 | 569 | 562 | 462 | 547 |
| Elongation (%) |  | 340 | 298 | 342 | 290 | 515 | 326 | 340 | 342 | 510 | 344 |
| After 500 hours at 120° C. |  |  |  |  |  |  |  |  |  |  |  |
| Elongation (%) |  | 285 | 255 | 287 | 247 | 422 | 264 | 299 | 308 | 433 | 148 |
| Elongation-holding coefficient (%) |  | 84 | 86 | 84 | 85 | 82 | 81 | 88 | 90 | 85 | 43 |
| Inflection property |  |  |  |  |  |  |  |  |  |  |  |

|  |  | Example |  | Comparative Example |  |  |  |  |  |  |  |
|---|---|---|---|---|---|---|---|---|---|---|---|
|  |  | 11 | 12 | 1 | 2 | 3 | 4 | 5 | 6 | 7 | 8 |
| Resin composition |  |  |  |  |  |  |  |  |  |  |  |
| Resin used (parts by weight) |  | P 96 | P 90 | P 100 | Q 100 | R 100 | P 99 | Q 99 | R 99 | PBT 98.5 | PBT 86 |
| Lactam | IPBC (parts by weight) | 4 | 10 | — | — | — | — | — | — | 1.5 | 1.5 |
|  | MDIC (parts by weight) | — | — | — | — | — | — | — | — | — | — |
| Flame-retardant (parts by weight) |  | — | — | — | — | — | — | — | — | — | 12.5 |
| Stabilizer (parts by weight) |  | — | — | — | — | — | 1.0 | 1.0 | 1.0 | — | — |
| Dielectric breakdown (kV/mm) |  | 17 | 16 | 17 | 17 | 18 | 18 | 18 | 18 | 14 | 14 |
| Dielectric constant |  | 3.2 | 3.2 | 3.2 | 3.2 | 3.3 | 3.2 | 3.2 | 3.3 | 3.3 | 3.1 |
| Flame-resistance |  |  |  |  |  |  |  |  |  |  | x |
| Oxygen index |  | 27 | 27 | 27 | 27 | 27 | 27 | 27 | 27 | 22 | 27 |
| Surface shape |  |  |  |  |  |  |  |  |  |  | x |
| Tensile strength (kg/cm²) |  | 569 | 531 | 543 | 550 | 450 | 543 | 550 | 451 | 528 | 542 |
| Elongation (%) |  | 315 | 276 | 350 | 345 | 550 | 350 | 345 | 548 | 305 | 75 |
| After 500 hours at 120° C. |  |  |  |  |  |  |  |  |  |  |  |
| Elongation (%) |  | 277 | 193 | 77 | 79 | 110 | 102 | 114 | 148 | 247 | 51 |
| Elongation-holding coefficient (%) |  | 88 | 70 | 22 | 23 | 20 | 29 | 33 | 27 | 81 | 68 |
| Inflection property |  |  |  | x | x | x | x | x | x |  | x |

The results are shown in Table 1.

EXAMPLE 10 to 12

The evaluation was carried out in the same manner as in Example 1 excepting that the resin composition was changed as shown in Table 1. The results are shown in Table 1.

COMPARATIVE EXAMPLES 1 to 6

The evaluation was carried out in the same manner as in Example 1 excepting that the copolymer used and the resin composition were changed as shown in Table 1 without adding bislactam compounds. The results are shown in Table 1.

COMPARATIVE EXAMPLE 7

IPBC of 1.5 parts by weight was added to polybutylene terephthalate of 98.5 parts by weight and the test pieces were prepared by mixing and evaluated in the same manner as in Example 1. The results are shown in Table 1.

What is claimed is:

1. A halogen-containing polyester resin composite, consisting of a bislactam compound and a flame-resistant aromatic polyester compound containing a halogen in an amount of 0.5 to 30% by weight, said resin obtained by the poly-condensation of
   (A) aromatic dicarboxylic acids or ester-forming derivatives thereof;
   (B) aliphatic glycols or ester-forming derivatives thereof;
   (C) a halogen-containing ester-forming compound, said bislactam compound being present in an amount of 0.1 to 10% by weight based on the total quantity of the composite.

2. The resin composite as set forth in claim 1, wherein the halogen is bromine.

3. The resin composite as set forth in claim 1 wherein said aliphatic glycols (B) are low molecular glycols have 2 to 8 carbon atoms.

4. The resin composite as set forth in claim 1 wherein said aliphatic glycols (B) are low molecular glycols having 2 to 8 carbon atoms and polyalkyleneoxide glycols having a molecular weight of 200 to 4,000.

5. The resin composite as set forth in claim 3 wherein said low molecular weight glycols of 2 to 8 carbon atoms are at least one kind selected from the group consisting of ethylene glycol, 1,4-butylene glycol and 1,4-butene glycol.

6. The resin composite as set forth in any one of claims 1 to 5, wherein said bislactam compounds are compounds expressed by the following general formula (a):

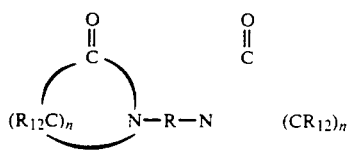

wherein R is a divalent organic group; $R_{12}$ is a hydrogen atom, an alky group or an aryl group; and n is an integer from 2 to 8.

7. The resin composite as set forth in claim 6, wherein R of the bislactam a compound expressed by the general formula (a) is compounds expressed by the following general formula (b) or (c):

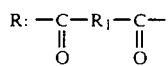

-continued

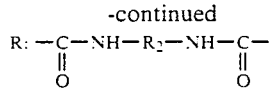

wherein $R_1$, $R_2$ is a divalent organic group.

8. The resin composite as set forth in claim 7, wherein $R_1$, $R_2$ in the general formulae (b), (c) is an organic group containing at least one aromatic ring.

9. An electric wire containing a coating material formed of a halogen-contained polyester resin composite, said composite consisting essentially of a bislactam compound and a flame-resistant aromatic polyester copolymer containing a halogen in an amount of 0.5 to 30% by weight, said resin obtained by the poly-condensation of
   (A) aromatic dicarboxylic acids or ester-forming derivatives thereof;
   (B) aliphatic glycols or ester-forming derivatives thereof; and
   (C) halogen-contained ester forming compounds, said bislactam compound being present in an amount of 0.1 to 10% by weight based on a total quantity of the composite disposed on the surface of a lead wire.

10. The electric wire as set forth in claim 9, wherein said halogen is bromine.

11. The electric wire as set forth in claim 9 or claim 10, wherein said electric wire is a low-voltage electric wire.

12. The electric wire as set forth in claim 11, wherein said electric wire is a low-voltage electric wire for use in car.

* * * * *